United States Patent

Ito et al.

[15] 3,706,422

[45] Dec. 19, 1972

[54] ENDLESS TAPE CARTRIDGE

[72] Inventors: Fukuzo Ito, Totsuka-ku, Yokahami-shi, Kanagawa-ken; Masaoki Sekine, Kawasaki-shi, Kanagawa-ken; Yasusuke Arai, Machida-shi, Tokyo, all of Japan

[73] Assignee: Tokyo Denki Kagaku Kogyo Kabushiki Kaisha, Tokyo-to, Japan

[22] Filed: March 13, 1970

[21] Appl. No.: 19,186

[30] Foreign Application Priority Data

March 18, 1969 Japan ................................44/20222

[52] U.S. Cl. ..............................................242/55.19 A
[51] Int. Cl. ..............................................B65h 17/48
[58] Field of Search....242/55.19 A, 55.19, 194, 197, 242/198, 199, 200, 71.1, 71.2; 274/4 C, 11 C; 179/100.2 Z; 352/78, 128

[56] References Cited

UNITED STATES PATENTS

| | | | |
|---|---|---|---|
| 3,025,012 | 3/1962 | Fries | 242/55.19 A |
| 3,326,484 | 6/1967 | Yefsky | 242/55.19 A |
| 3,259,332 | 7/1966 | Francis | 242/55.19 A |
| 3,559,908 | 2/1971 | Esashi | 242/55.19 A |

FOREIGN PATENTS OR APPLICATIONS

| | | | |
|---|---|---|---|
| 1,001,967 | 8/1965 | Great Britain | 242/55.19 A |

*Primary Examiner*—Billy S. Taylor
*Attorney*—Blum, Moscovitz, Friedman & Kaplan

[57] ABSTRACT

According to the present invention, a magnetic tape is allowed to run in a normal way and can be taken up on a hub in a convoluted manner, even if the endless cartridge is mounted upside down, on a sound-recording and playback apparatus or such sound-recording and playback apparatus is operated with said apparatus itself being turned upside down. The present invention is featured, among others, by the fact that a rotary member adapted to receive the tape wound up on the hub and to give rotational movement to the wound up tape is provided in the cartridge in opposed relation with a rotary plate serving as a tape receiver means in the endless cartridge.

6 Claims, 8 Drawing Figures

ENDLESS TAPE CARTRIDGE

BACKGROUND OF THE INVENTION

An endless cartridge, in general, is constructed such that a magnetic looped tape of an endless array is wound up on a hub on a rotary disc mounted rotatably in the cartridge and this tape is pulled out from the innermost convolution of the wound tape and is rewound on the outermost convolution of the wound tape.

To state it in a more particular way, in a cartridge using a looped endless magnetic tape, the tape is wound up in a convoluted manner and placed on a rotary disc, and then the tape is pulled out, as so desired, from the central portion thereof, passed round a guide roller and then a pinch roller, and finally rewound on the outer periphery of the wound tape on a take-up reel, to thereby connect the tape in an endless looped manner. In order to carry out smooth winding and pulling out operation, movement of such magnetic tape must be controlled by suitable friction produced between the convoluted layer of the tape and the surface of the rotary disc engaged with the tape driving shaft. According to such mechanism, however, if the cartridge is fitted upside down in a sound-recording and playback apparatus or if such recording and playback apparatus is operated with said apparatus itself being turned upside down, it follows that the convoluted layer-formed portion of the tape is dislocated out of contact with the rotary disc, causing the tape pulled out from the central position thereof to fail to be wound up in a normal manner. Rather, the tape, which was pulled out and stretched by the capstan and the pinch roller, is either conglomerated into a disorderly mass or coiled around the capstan and/or the pinch roller, and as a result, the tape becomes unable to continue its smooth running, or it breaks or receives damage, making it impossible to continue operation.

SUMMARY OF THE INVENTION

The present invention is characterized by an improved endless cartridge construction in which a rotary disc adapted to rotate with a magnetic tape placed thereon, or an auxiliary rotary plate adapted to rotate in conformity to rotational movement of a tape-winding hub integral with said rotary disc, is disposed adjacent to the top face of the convoluted layer portion of the endless tape such that when the cartridge is used in an inverted condition, said convoluted layer portion of the tape and said auxiliary rotary plate are contacted with each other so that said convoluted layer portion of the tape is caused to rotate by friction therebetween, to thereby permit continued smooth running of the tape so that the tape may be continuously pulled out from its central portion and rewound on the outer periphery of the wound tape.

The present invention relates to improvements in an endless cartridge for magnetic sound-recording and playback by use of a magnetic looped tape of an endless array, and more particularly to such cartridge which may be used even in an inverted position.

The primary object of the present invention is to effectively eliminate the above-described defects inherent to the conventional devices and to provide an improved endless cartridge which is simple in structure, may be used even in an inverted position and can be manufactured at low cost.

Another object of the present invention is to provide an endless cartridge whereby no matter whether it is used in a normal or in an inverted condition, the tape can be pulled out in smooth rotation from a hub on which an endless tape is wound, and can also be smoothly taken up on a reel, without impairing smoothness on the convoluted tape layer portion.

It is still another object of the present invention to manufacture the cartridges suitable for mass production, in which the running of the tape is stabilized, the winding up of the tape is attained steadily and uniformly, both the upper and lower faces of the convoluted layer portion are regulated in a fixed manner, damage to the tape is minimized, and also the tightening force of the tape is suitably mitigated.

According to the present invention, even if the endless cartridge is used by turning it upside down, the convoluted layer-formed portion of the endless tape is well controlled by moderate friction produced between it and an auxiliary rotary plate member, thus allowing to practice a normal tape taking up operation while eliminating any fear of forcing the pulled out tape to turn into a conglomeration or to coil around the capstan or the pinch roller to cause stoppage of the tape running or cuts or other troubles in the tape, which has been often witnessed in a conventional device.

Also, the present invention permits smooth and warrantable pulling-out of the endless tape contacted with the outer periphery of a hub on which the tape is wound, and also, even if the cartridge is operated in a topsy-turvy condition, continued operation of the endless tape is ensured without producing any abnormality during the taking up and running of the tape, and positive and sure rewinding of the tape is also guaranteed, with little fear of causing damage to the tape.

In the cartridge of the present invention, the tape wound on a hub can be pulled out in a perfect manner with smooth rotation, and the pulled out tape is suitably controlled by a rotary disc or an auxiliary rotary plate on the convoluted layers of the tape and is orderly and trimly rewound on the multiple convolutions of the wound tape, thus guaranteeing always smooth and steady running of the tape without inviting increase of frictional resistance.

Additionally, in the cartridge of the present invention, no matter whether it is used in a normal or inverted condition, the tape wound on the hub can be led out rotatingly without losing its smoothness and without applying excessive loads on the tape during operation, and even if a thin tape is used in the cartridge of the present invention, the tape won't break and a much longer tape can be taken up in the cartridge. Moreover, the construction of the cartridge is simple and the production cost is moderate. Thus, the present invention is advantageous in its aspect of economy, too.

BRIEF DESCRIPTION OF THE DRAWINGS

Now, a preferred embodiment of the present invention will be explicated in detail with reference to the accompanying drawings, in which.

Figure 6:
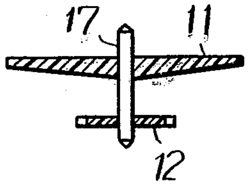
FIG. 6 is a sectional side view showing a modified form of the auxiliary rotary plate used in the present invention.

Referring first to FIGS. 1 to 4 of the drawings, it will be noted that an inner hub 2 serving as a driving member for winding up the tape and an outer hub 3 disposed around the outer periphery of said inner hub 2 are rotatably mounted in a cartridge casing 1 made of synthetic resin, and around the outer periphery of said outer hub 3 is wound up an endless tape *t* such as to form the convoluted tape layers T. A tape portion extended out from the center or the innermost convolution of the tape layers T, with the tape twists being corrected simultaneously is passed around a guide roller 4 and further stretched past a sound-recording and playing-back section 5 of a sound recording and playback machine (not shown) and between a capstan 6 and a pinch roller 7, and finally rewound on the outermost convolution of the tape layers T. As will also be noted, said casing 1 has formed therein a driving shaft inserting hole 8 and a regulating pin receiving hole 9. Also in the figures, reference number 10 denotes a rotary disc which, in the shown embodiment, is adapted as a plate-like rotary block made of synthetic resin, teflon, polyacetal resin or other like material and which has formed in its center an integrally constructed inner hub 2 and a driving shaft engaging section. Along a peripheral edge of said rotary disc 10 is formed a toothed segment arranged to be meshed with a pinion 12 secured to the rotary shaft of an auxiliary disc member 11 so as to transmit rotations of said rotary disc 10. It is to be noted that said auxiliary disc 11 is arranged such that it is spaced a small distance *d* from the top face of the convoluted tape layers T and that its radius extends over said tape layers T. The underside (the part contacted with the top face of the convoluted tape layers T) of the auxiliary disc 11 may be of planar shape, but preferably, it is tapered towards its periphery as shown in FIG. 6 so that the face of friction with the auxiliary disc 11 will be enlarged towards the outer periphery of the convoluted tape layers T.

In the above-described construction, when the endless cartridge is used in a normal condition, or with its upside facing upward, the convoluted tape layers T are contacted with the upper face of the rotary disc 10 while the auxiliary disc 11 is kept spaced a distance d from said layers, so that rotation of the driving shaft of the recording and playback machine causes the rotary disc 10 to accordingly rotate therewith, which, in turn, causes the tape layers T to rotate due to friction produced between said disc 10 and said tape layers T. Consequently, the tape is pulled out by a combined force of the pinch roller 7 and the capstan 6 and is rewound on the tape layers T.

When the cartridge is used upside down, tape layers T will fall, due to its own weight, from the rotary disc 10 to the underside of the auxiliary plate 11. Therefore, rotational motion of the rotary disc 10 is transmitted through the pinion 12 to the auxiliary disc 11, allowing the tape layers T to be rotated by friction force produced in cooperation with said auxiliary disc 11, and thus the tape can be taken up in the same satisfactory manner as when the cartridge is used in a normal manner.

In the instant embodiment, the construction is arranged such that the rotations of the rotary disc 10 are transmitted to the auxiliary disc 11 through a pinion 12 provided at the outer periphery of said rotary disc 10, but the pinion 12 may be of a friction-driven type, or in some cases, a drive transmission system utilizing belt means may be employed to attain the object.

Figure 1:
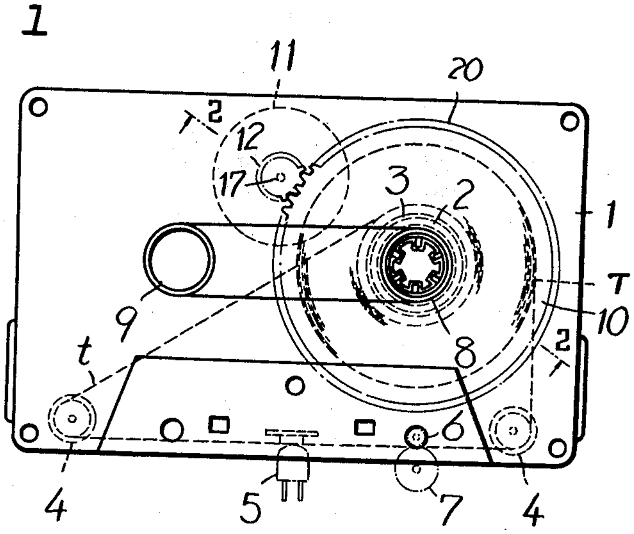
FIG. 1 is a partially cut-away plan view of the cartridge according to the present invention.
Figure 2:
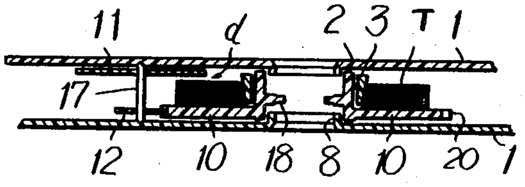
FIG. 2 is a sectional view as taken along the line 2-2 of FIG. 1.
Figure 3:
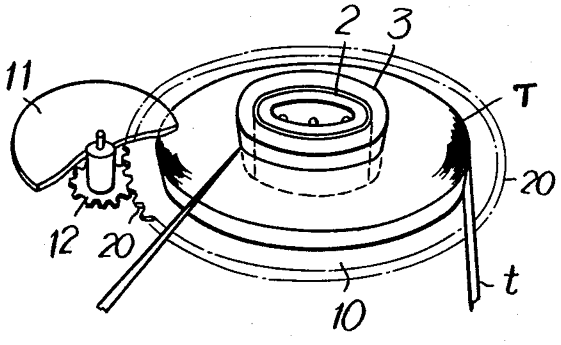
FIG. 3 is a partially cut-away perspective view of the principal parts of the cartridge shown in FIG. 1.
Figure 4:
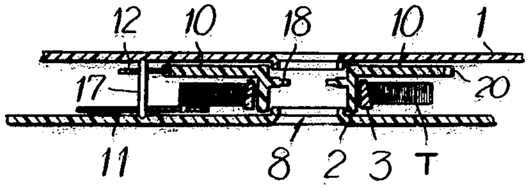
FIG. 4 is a sectional view as taken along the line 2—2 of FIG. 1 but showing a different manner of usage where the cartridge is used in an inverted or upside down condition.
Figure 5:
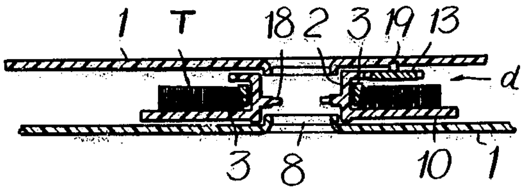
FIG. 5 is a sectional side view of the principal parts of another embodiment of the cartridge according to the present invention.

Referring now to FIG. 5, there is shown there a different embodiment in which, in stead of providing an integral toothed portion along the periphery of the rotary disc 10, a separate auxiliary gear 13 is provided such that it is driven from a portion near to the center of the rotary disc 10 or from the inner hub 2, and said auxiliary gear 13 is used as an auxiliary rotary plate so that friction is produced between the underside of said gear 13 and the upper side of the layered tape T to thereby achieve the same effect as in the preceding embodiments.

Figure 7:
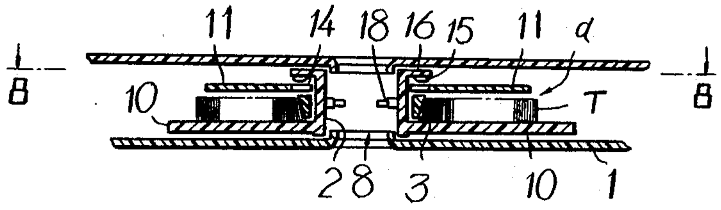
FIG. 7 is a sectional side view showing still another embodiment of the cartridge device according to the present invention.
Figure 8:
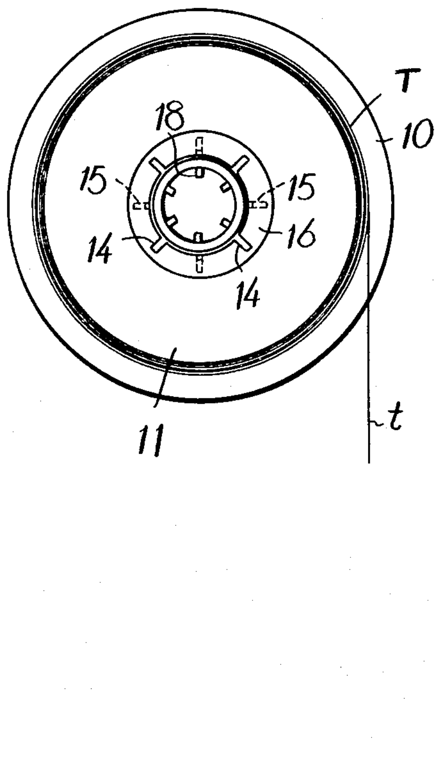
FIG. 8 is a sectional plan view as taken along the line 8—8 of FIG. 7.
Figure 7:
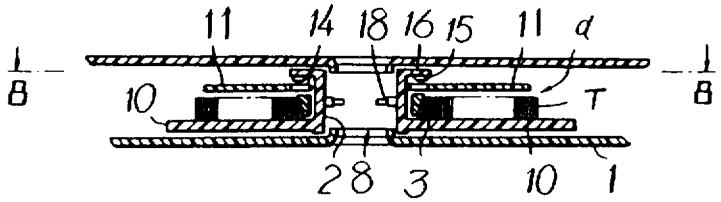
Figure 8:
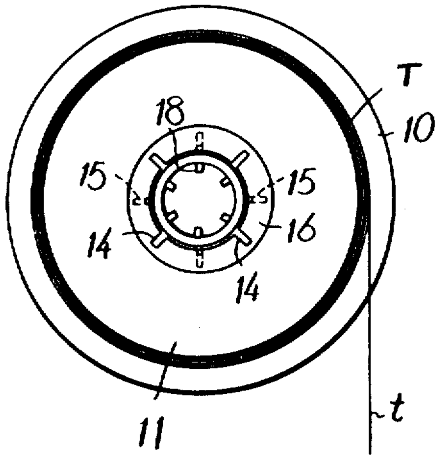

In still another embodiment illustrated in FIGS. 7 and 8, an auxiliary rotary plate 11 adapted rotatable on the outer 3 or the inner hub 2 is located at an upper position opposed to said rotary disc 10, and the clutch portions such as recesses 14 (as in the present embodiment) or protuberances are formed in said auxiliary rotary plate 11, and the other clutch portions engaged with the first-said clutch portions, such as protuberances 15 or recesses which fit with said recesses or protuberances, are provided on the inner hub 2 or on its extension 16, such that said clutch portions 14 and 15 are disengaged when using the front side of the cartridge, that is when the cartridge is used in a normal manner, and that when using the back side of the cartridge, or when it is used upside down, said portions are engaged with one another to allow the auxiliary rotary plate 11 to be actuated to rotate.

Also in the drawings, 17 denotes a strut, 18 driving pins adapted to project into the shaft hole of the inner hub 2, 19 a rotary shaft, and 20 a toothed segment.

The size of the auxiliary rotary plate 11 may be optionally selected according to the diameter of the tape spool, provided that it contacts a part of the convoluted tape layers.

What is claimed is:

1. An endless magnetic tape cartridge comprising an outer hub member having said magnetic tape wound thereon in a convoluted manner for removal from the innermost convolution adjacent said outer hub member and rewinding on the outermost of said convolution; an inner rotatable hub member extending axially on at least one side beyond said outer hub member; a first plate member coupled to said inner hub member for rotation therewith and positioned for engagement with one edge of said convolutions of said magnetic tape when said cartridge is positioned in its normal position; a second rotatable plate member mounted in spaced relation to said first plate member a distance such that said convolutions of magnetic tape are out of engagement with said second plate member when said cartridge is in said normal position, but at least a portion of said convolutions are engaged thereto at their other edge when said cartridge is inverted from its normal position; and means for operatively coupling said inner hub member and said second plate member for the coordinate rotation thereof, whereby rotational motion is applied to the woundup tape whether said cartridge is in its normal or inverted position.

2. A cartridge as recited in claim 1, wherein said operative coupling means includes a shaft supporting said further plate member for rotation, said shaft being positioned adjacent the periphery of said first plate member, and means operatively connecting said shaft and the periphery of said first plate member for transmitting the rotation of said first plate member to said shaft and said second plate member.

3. A cartridge as recited in claim 2, wherein the periphery of said second plate member is formed with gear teeth; and including a spur gear mounted on said shaft in operative engagement with said gear teeth.

4. A cartridge as recited in claim 1, wherein said inner hub member projects axially on both sides of said outer hub member; said second plate member being mounted for rotatable displacement adjacent the projecting end of said inner hub member opposed to said first plate member, said operative coupling means operatively coupling said last-mentioned projecting end of said inner hub member and said second plate member.

5. A cartridge as recited in claim 4, wherein said coordinate displacing means comprises mating teeth on the periphery of said second plate member and said projecting end of said hub member.

6. A cartridge as recited in claim 1, wherein said inner hub member projects axially on both sides of said outer hub member and is formed with a radial flange extending therefrom spaced from said first plate member; said second plate member being formed with a central opening therethrough for receipt of said inner hub member, said second plate member being positioned for free axial displacement relative to said hub member between a first position assumed when said cartridge is in said normal position out of engagement with both said other edge of said convolutions and said hub radial flange, and a second position assumed when said cartridge is in said inverted position in engagement with said hub radial flange at which at least a portion of said other edges of said convolutions engage therewith, said operative coupling means operatively transmitting the drive of said hub to said second plate member at the second position thereof.

* * * * *

UNITED STATES PATENT OFFICE
CERTIFICATE OF CORRECTION

Patent No. 3,706,422 Dated Dec. 19, 1972

Inventor(s) Fukuzo Ito

It is certified that error appears in the above-identified patent and that said Letters Patent are hereby corrected as shown below:

Figures 7 and 8 of the drawings as shown on the attached sheet should be included, but will apply to the Grant only.

Signed and sealed this 20th day of May 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

PATENT NO. : 3,706,422

DATED : December 19, 1972

INVENTOR(S) : Fukuzo Ito, Masaoki Sekine, Yasusuke Arai

It is certified that error appears in the above-identified patent and that said Letters Patent are hereby corrected as shown below:

Column 5, line 23, change "second" to -- first --.

Signed and Sealed this

Seventh Day of September 1976

[SEAL]

*Attest:*

RUTH C. MASON
*Attesting Officer*

C. MARSHALL DANN
*Commissioner of Patents and Trademarks*